United States Patent
Bao et al.

(10) Patent No.: US 9,670,100 B2
(45) Date of Patent: Jun. 6, 2017

(54) FABRICATION OF ULTRAFINE POLYCRYSTALLINE DIAMOND WITH NANO-SIZED GRAIN GROWTH INHIBITOR

(75) Inventors: Yahua Bao, Orem, UT (US); Xian Yao, Sandy, UT (US); Scott Horman, Lindon, UT (US)

(73) Assignee: Element Six Limited, County Clare (IE)

( * ) Notice: Subject to any disclaimer, the term of this patent is extended or adjusted under 35 U.S.C. 154(b) by 193 days.

(21) Appl. No.: 13/306,913

(22) Filed: Nov. 29, 2011

(65) Prior Publication Data

US 2012/0131856 A1    May 31, 2012

Related U.S. Application Data

(60) Provisional application No. 61/417,811, filed on Nov. 29, 2010.

(51) Int. Cl.
*B24D 3/00* (2006.01)
*B24D 3/02* (2006.01)
(Continued)

(52) U.S. Cl.
CPC .............. *C04B 35/52* (2013.01); *B82Y 30/00* (2013.01); *C04B 35/62821* (2013.01);
(Continued)

(58) Field of Classification Search
USPC ......................................... 51/293, 307, 309
See application file for complete search history.

(56) References Cited

U.S. PATENT DOCUMENTS 3,679,442 A * 7/1972 Bergna ................ C04B 35/5611
264/332
4,766,040 A    8/1988 Hillert et al.
(Continued)

FOREIGN PATENT DOCUMENTS

GB    2502170    11/2013
WO    WO 04/001238 A2    12/2003
(Continued)

OTHER PUBLICATIONS

M. Amar et al.; *Deposition of polycrystalline diamond films on High Speed Steel using TiN Interlayers*;ASM International; Proceedings of the 3rd International Surface Engineering Congress, Aug. 2-4, 2004, Orlando Airport Marriott, Orlando, Florida, USA; pp. 83-86.
(Continued)

*Primary Examiner* — James McDonough
(74) *Attorney, Agent, or Firm* — Armstrong Teasdale LLP

(57) ABSTRACT

The present disclosure relates to the formation of polycrystalline diamond materials with fine diamond grains and nano-sized particles of a grain growth inhibitor. In one embodiment, a method of fabricating a polycrystalline diamond material is provided. The method includes providing a mixture of diamond particles with an average particle size of about 1 micron or less, distributing a plurality of nano-sized titanium-containing particles with the diamond mixture, to act as a grain growth inhibitor, and sintering the mixture of diamond particles and titanium-containing particles at high pressure and high temperature to create a polycrystalline structure of sintered diamond grains. The sintered diamond grains have an average size of about 1 micron or less.

9 Claims, 6 Drawing Sheets

(51) Int. Cl.
  *B24D 11/00* (2006.01)
  *B24D 18/00* (2006.01)
  *C09K 3/14* (2006.01)
  *C04B 35/52* (2006.01)
  *C04B 35/628* (2006.01)
  *C04B 35/645* (2006.01)
  *C22C 26/00* (2006.01)
  *B82Y 30/00* (2011.01)

(52) U.S. Cl.
  CPC .. *C04B 35/62826* (2013.01); *C04B 35/62831* (2013.01); *C04B 35/62836* (2013.01); *C04B 35/62886* (2013.01); *C04B 35/62892* (2013.01); *C04B 35/645* (2013.01); *C22C 26/00* (2013.01); *C04B 2235/3232* (2013.01); *C04B 2235/3843* (2013.01); *C04B 2235/3856* (2013.01); *C04B 2235/3886* (2013.01); *C04B 2235/427* (2013.01); *C04B 2235/46* (2013.01); *C04B 2235/465* (2013.01); *C04B 2235/5436* (2013.01); *C04B 2235/5445* (2013.01); *C04B 2235/5454* (2013.01); *C04B 2235/785* (2013.01); *C04B 2235/786* (2013.01)

(56) References Cited

U.S. PATENT DOCUMENTS

| | | | |
|---|---|---|---|
| 5,030,276 A | 7/1991 | Sung et al. | |
| 5,135,061 A | 8/1992 | Newton, Jr. | |
| 5,435,815 A | 7/1995 | Ikegaya et al. | |
| 5,690,706 A | 11/1997 | Sigalas et al. | |
| 5,697,994 A | 12/1997 | Packer et al. | |
| 5,848,348 A | 12/1998 | Dennis | |
| 6,290,726 B1 | 9/2001 | Pope et al. | |
| 6,361,873 B1 | 3/2002 | Yong et al. | |
| 6,410,877 B1 | 6/2002 | Dixon et al. | |
| 6,456,054 B1 | 9/2002 | Kataoka | |
| 6,471,449 B1 | 10/2002 | Kataoka | |
| 6,579,045 B1 | 6/2003 | Fries et al. | |
| 6,655,845 B1 | 12/2003 | Pope et al. | |
| 6,712,564 B1 | 3/2004 | Hughes et al. | |
| 7,441,610 B2 | 10/2008 | Belnap et al. | |
| 2003/0189114 A1 | 10/2003 | Taylor et al. | |
| 2006/0165993 A1 | 7/2006 | Keshavan | |
| 2006/0191722 A1* | 8/2006 | Belnap | C22C 26/00 175/374 |
| 2008/0115424 A1* | 5/2008 | Can | C09K 3/1445 51/309 |
| 2008/0223621 A1 | 9/2008 | Middlemiss et al. | |
| 2009/0313907 A1 | 12/2009 | Can et al. | |
| 2010/0009839 A1 | 1/2010 | Can et al. | |
| 2010/0126779 A1 | 5/2010 | Corbett et al. | |
| 2011/0052803 A1* | 3/2011 | Bao | B22F 1/025 427/190 |

FOREIGN PATENT DOCUMENTS

| WO | WO 2007/144733 A2 | 12/2007 |
|---|---|---|
| WO | WO 2010/073198 A2 | 7/2010 |

OTHER PUBLICATIONS

J. Musil; *Hard and superhard nanocomposite coatings;* Surface and Coatings Technology; vol. 125; Elsevier Science S.A.; 2000; pp. 322-330.

Jingguo Li et al.; *Synthesis of Ncmocrystalline Titanium Nitride Powders by Direct Nitridation of Titanium Oxide;* J. Am. Cera. Soc. (Journal); vol. 84; 2001; pp. 3045-3047.

O. Contreras et al.; *Interface analysis of CVD diamond on TiN surfaces;* Applied Surface Science; vol. 158; Elsevier Science S.A.; 2000; pp. 236-245.

Vladimir P. Poliakov et al.; *The influence of refractory particles (Al₂O₃, TiN) on the mechanical strength of carbonado type synthesized polycrystalline diamonds;* Diamond and Related Materials; vol. 7; Elsevier Science B.V.; 1998; pp. 422-426.

Great Britian Search Report for British Patent Application No. GB1120497.1, dated Mar. 22, 2012.

Hall H. T., High Pressure-Temperature Apparatus, Chapter 4 (pp. 144-179), Metallurgy at High Pressures and High Temperatures, edited by K.A. Gschneidner, Jr., M.T. Hepworth and N.A.D. Parlee; Gordon and Breach Science Publishers, New York, 1964.

Pacella et al., FIB/TEM/EELS micro/nanometric investigations of the effects of laser ablation on the diamond/binder structure in polycrystalline diamond composites, Journal of Materials Processing Technology, 2014, 214: 1153-1161.

* cited by examiner

FABRICATION OF ULTRAFINE POLYCRYSTALLINE DIAMOND WITH NANO-SIZED GRAIN GROWTH INHIBITOR

This application claims priority to and the benefit of U.S. Provisional Application No 61/417,811, filed Nov. 29, 2010, the entire contents of which are incorporated herein by reference.

FIELD OF THE INVENTION

Field of the Invention

The present invention relates to the formation of polycrystalline diamond materials with very fine diamond grains and nano-sized particles of a grain growth inhibitor.

Background

Sintered polycrystalline diamond material is known for its good wear resistance and mechanical strength, and is often used in cutting tools. To form polycrystalline diamond (PCD), diamond particles are sintered at high pressure and high temperature (HPHT sintering) to produce an ultra-hard polycrystalline structure. A catalyst material such as cobalt or another metal may be added to the diamond particle mixture prior to sintering in order to promote the formation of the diamond crystals during HPHT sintering. The resulting PCD structure includes a network of interconnected diamond crystals bonded to each other, with the catalyst material occupying the spaces or pores between the bonded diamond crystals.

Ultra-fine PCD, such as PCD with sintered diamond crystals on the order of about 1 micron in size or less, is known for its superior mechanical properties and performance. However, ultra-fine sintered PCD is difficult to create, due to the small size of the diamond particles. The very small diamond particles have a large ratio of surface area to volume, and this higher surface area ratio can cause abnormal grain growth of the diamond crystals during sintering. In particular, during HPHT sintering, very fine diamond particles may interconnect and grow into very large diamond grains, growing to sizes many times greater than the size of the original diamond particles. As a result, the sintered material is not uniform, as the PCD structure is interrupted by areas of large grain growth. This disparity in grain size and the lack of uniform polycrystalline structure degrade the performance and material characteristics of the sintered PCD material.

Accordingly, it is known to provide a grain growth inhibitor with the diamond particle mixture in order to limit the growth of large, abnormal diamond crystals during HPHT sintering. The grain growth inhibitor is added to the diamond particle mixture, and during HPHT sintering the grain growth inhibitor occupies space at the boundaries between diamond particles and prevents the particles from growing together into larger grain sizes.

However, it has been difficult to uniformly distribute a grain growth inhibitor within the diamond particle mixture. Known methods include physical vapor deposition and other lengthy and expensive chemical processes. Physically blending the grain growth inhibitor with the diamond particles is possible with larger particles of grain growth inhibitor, but difficult to accomplish with smaller particles, as they tend to clump and agglomerate due to their large surface area. It has been observed that when the diamond mixture includes clumps of grain growth inhibitor particles, or grain growth inhibitor particles that are about the same size or larger than the diamond particles themselves, then after HPHT sintering the resulting PCD structure may have large areas of grain growth inhibitor between the diamond crystals. These areas of grain growth inhibitor reduce the strength and wear properties of the sintered PCD material.

Accordingly, there is still a need for a method of uniformly mixing a grain growth inhibitor with ultra-fine diamond particles in order to produce a uniform PCD structure with desired material properties and reduced abnormal grain growth.

SUMMARY

The present disclosure relates to the formation of polycrystalline diamond materials with fine diamond grains and nano-sized particles of a grain growth inhibitor. In one embodiment, a method of fabricating an ultra-fine PCD material with uniform sintered grain size is provided. The method includes providing a mixture of ultra-fine diamond particles, such as a mixture of diamond particles that are about 0.5 to 1 micron in size. The method then includes uniformly distributing a nano-sized titanium-containing grain growth inhibitor in the ultra-fine diamond mixture. For example, the grain growth inhibitor may be TiCN, TiN, and/or TiC. The method then includes HPHT sintering the mixture, to produce a sintered PCD structure with uniform diamond crystal grain size.

In one embodiment, a method of fabricating a polycrystalline diamond material is provided. The method includes providing a mixture of diamond particles with an average particle size of about 1 micron or less, distributing a plurality of nano-sized titanium-containing particles with the diamond mixture, to act as a grain growth inhibitor, and sintering the mixture of diamond particles and titanium-containing particles at high pressure and high temperature to create a polycrystalline structure of sintered diamond grains. The sintered diamond grains have an average size of about 1 micron or less.

In one embodiment, a method of fabricating a polycrystalline diamond material is provided. The method includes providing a mixture of diamond particles with an average particle size of about 1 micron or less, distributing a plurality of nano-sized titanium-containing particles with the diamond mixture, to act as a grain growth inhibitor, and sintering the mixture of diamond particles and titanium-containing particles at high pressure and high temperature to create a polycrystalline structure of sintered diamond grains. The sintered diamond grains have an average size of about 1 micron or less.

DETAILED DESCRIPTION

The present disclosure relates to the formation of polycrystalline diamond materials with fine diamond grains and nano-sized particles of a grain growth inhibitor. In one embodiment, a method of fabricating an ultra-fine PCD material with uniform sintered grain size is provided. The method includes providing a mixture of ultra-fine diamond particles, such as a mixture of diamond particles that are about 0.5 to 1 micron in size. The method then includes uniformly distributing a nano-sized titanium-containing grain growth inhibitor in the ultra-fine diamond mixture. For example, the grain growth inhibitor may be TiCN, TiN, and/or TiC, and the particles of the grain growth inhibitor are on the order of 50 nanometers in size. The method then includes HPHT sintering the mixture, to produce a sintered PCD structure with uniform diamond crystal grain size.

Throughout the disclosure and claims, references to TiCN, TiN, and TiC include stoichiometric as well as non-stoichiometric compounds. That is, these compounds include compounds with a 1:1 ratio of the elements, as well as other ratios. For example, references to TiN include $TiN_x$, where $0<x \le 1$. References to TiC include $TiC_x$, where $0<x \le 1$. References to TiCN include $TiC_xN_y$, where $0<x$ and $0<y \le 1$.

Figure 1:
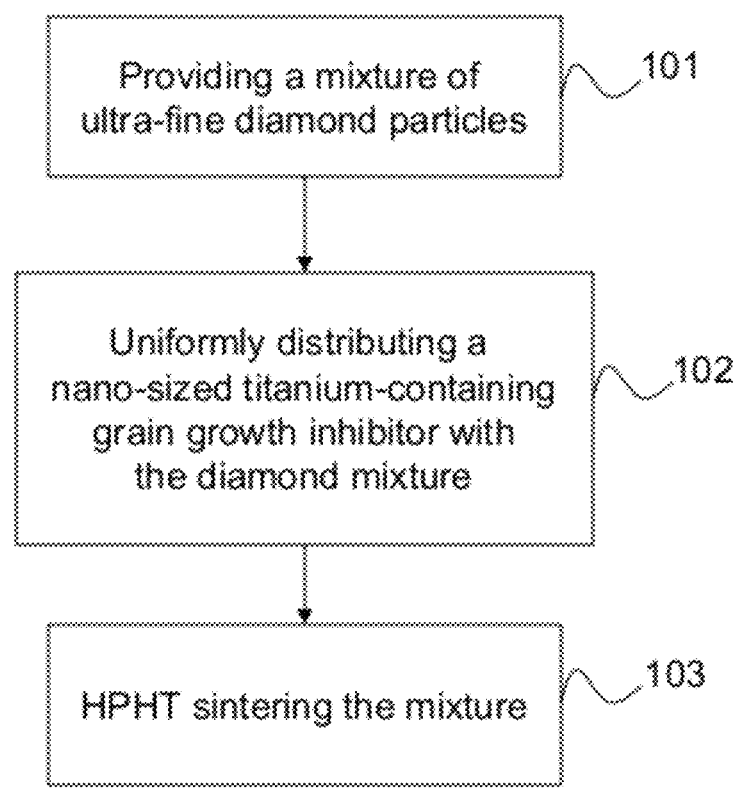
FIG. 1 is a flowchart showing a method of fabricating an ultra-fine PCD material with uniform sintered grain size according to an embodiment of the present disclosure.

A method of fabricating an ultra-fine PCD material with uniform grain size according to an embodiment of the present disclosure is shown in FIG. 1. The method includes providing a mixture of ultra-fine diamond particles (101), such as diamond particles with an average particle size less than about 1 micron. In one embodiment, the mixture includes a range of diamond particles between about 0.5 and 1 micron in size. The average particle size is about 0.75 micron. In another embodiment, the mixture includes a range of diamond particles between about 0.2 and 1 micron in size, with an average particle size of about 0.75 micron, and in another embodiment, between about 0.2 and 0.5 micron in size, with an average particle size of about 0.35 micron. In another embodiment, the mixture includes a range of diamond particles between about 0.2 and 2 micron in size, and in another embodiment from about 0.3 to 0.8 micron. In other embodiments, other size ranges may be used. As used herein, references to "ultra-fine" diamond particle mixtures includes mixtures with an average particle size of about 1 micron or less. The diamond particle mixture may be provided in powder form, with the various diamond particles blended together.

Referring again to FIG. 1, the method then includes uniformly distributing a nano-sized titanium-containing grain growth inhibitor with the diamond mixture (102). The grain growth inhibitor may be, for example, nano-sized particles of TiC, or TiCN, or TiN, or combinations of these. The average size of the particles of the grain growth inhibitor is smaller than the average diamond particle size. In one embodiment, substantially all of the particles of the grain growth inhibitor are smaller than the average diamond particle size, or in another exemplary embodiment smaller than substantially all of the diamond particles. In one embodiment, the grain growth inhibitor particles are about the same as or smaller than the average diamond particle size. In another embodiment, the grain growth inhibitor particles are less than (such as about an order of magnitude less than) the average diamond particle size. In another embodiment the diamond particles are approximately 0.2 to 1 micron in size, and the grain growth inhibitor particles are approximately 50 nanometers in size. In another embodiment the grain growth inhibitor particles range in size between about 10 to about 200 nanometers, with the average particle size being about 50 nanometers. As used herein, the term "nano-sized" means between about 20-200 nanometers in size, such as around approximately 50 nanometers in size.

As mentioned, the method includes uniformly distributing the grain growth inhibitor with the diamond mixture. The uniform distribution spreads the grain growth inhibitor throughout the diamond particle mixture to reduce the occurrence of clumps and agglomerations of the nano-sized grain growth inhibitor.

Referring again to FIG. 1, after the grain growth inhibitor has been uniformly mixed with the diamond particles, the method includes HPHT sintering the mixture (103). In one embodiment, HPHT sintering comprises pressing the mixture at a pressure in the range of 3 to 6.5 GPa at an elevated temperature in the range of 1300-1500° C. The PCD structure is formed during HPHT sintering, and the grain growth inhibitor acts to reduce the occurrences of large, abnormal grains. As a result, the sintered PCD structure includes ultra-fine diamond crystals that are about 1 micron in size. The sintered PCD structure is uniform, substantially free of abnormal diamond grain growth, and with no visible agglomerations of the grain growth inhibitor particles that are on the same scale as the diamond crystals.

Figure 2:
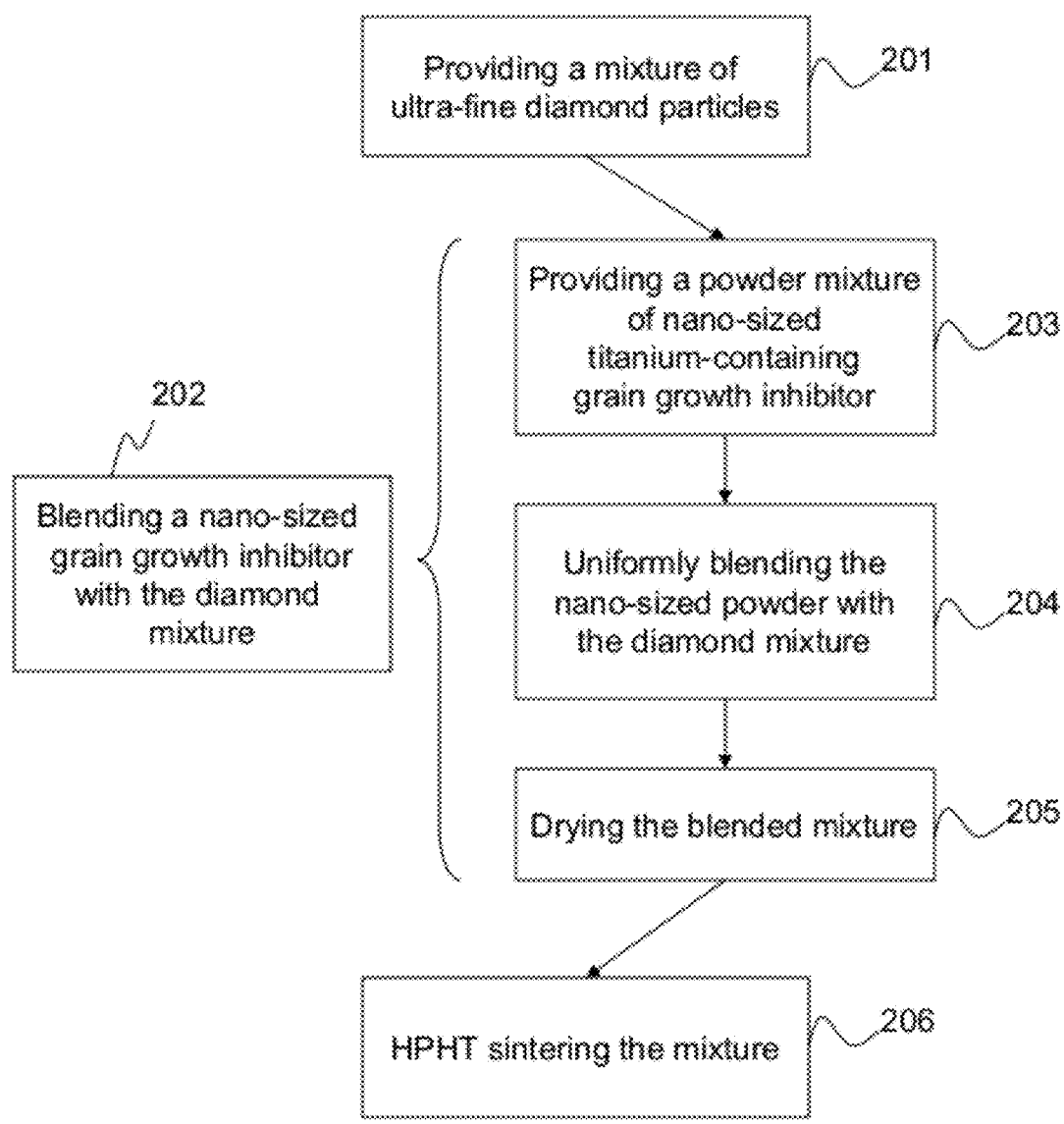
FIG. 2 is a flowchart showing a method of fabricating an ultra-fine PCD material with uniform sintered grain size according to an embodiment of the present disclosure.

Exemplary embodiments of methods for uniformly distributing the nano-sized grain growth inhibitor with the diamond mixture are described below. A method of fabricating an ultra-fine PCD material with uniform sintered grain size according to another embodiment of the present disclosure is shown in FIG. 2. The method includes providing a mixture of ultra-fine diamond particles (201), in the same manner as described above. The method also includes blending a nano-sized grain growth inhibitor with the diamond powder mixture (202). In one embodiment, blending includes providing a nano-sized powder mixture of a titanium-containing grain growth inhibitor (203), such as titanium carbon nitride (TiCN), titanium carbide (TiC), titanium nitride (TiN), or a combination of one or more of these compounds. The method includes uniformly blending the nano-sized powder with the diamond particle mixture (204). This uniform blending can be accomplished by ball milling or attritor mixing. The TiCN, TiC, and/or TiN particles are provided in powder form for blending with the diamond mixture, which may also be provided in powder form. The method may also include drying the mixture (205) after blending. The Ti-compound particles are uniformly interdispersed among the diamond particles. In one embodiment, the Ti-compound particles are provided in an amount in the range of about 0.5 to 10% by weight of the blended mixture, and in one embodiment about 1.5% by weight.

The mixture may be checked visually to determine if a uniform distribution has been achieved. For example, the mixture may be blended as described above and then visually inspected under a scanning electron microscope (SEM) to identify any large agglomerations or chunks. Further blending may be performed until the distribution is uniform. A uniform mixture may be obtained after blending for about 30 minutes to 2 hours.

In one embodiment, the grain growth inhibitor is TiCN and is provided in an amount of about 2% to about 10% by weight of the diamond and TiCN mixture. The resulting mixture is a mixture of nano-sized TiCN particles and sub-micron sized diamond particles uniformly blended together. A catalyst material may be added to the mixture before or after blending the grain growth inhibitor. For example, the diamond particles may be coated with cobalt particles (as the catalyst material) by a wet chemical method prior to blending the grain growth inhibitor. It should be understood that the grain growth inhibitor material is not the same as the catalyst material that promotes the formation of the PCD structure.

Referring again to FIG. 2, after blending, the method includes HPHT sintering the mixture of diamond particles and grain growth inhibitor (206). The HPHT sintering creates a polycrystalline structure of bonded diamond crystals. In one embodiment, the diamond particle mixture is sintered in the presence of a substrate, such as being sintered adjacent to a tungsten carbide substrate. Material from the substrate may infiltrate into the diamond layer during sintering to bond the diamond layer to the substrate.

In one embodiment, a PCD material was fabricated according to the method of FIG. 2. A mixture of ultra-fine sub-micron diamond particles (ranging from about 0.5 to 1 micron) was pre-coated with cobalt particles by a wet chemical method, and then blended with 1.5% by weight nano-sized TiCN particles, in powder form. The mixture was blended by attritor mixing to achieve a uniform distribution of the TiCN particles in the diamond mixture. The mixture was then HPHT sintered by pressing at about 5.2-6.5 GPa at a temperature of about 1420° C. The resulting PCD microstructure is shown in FIG. 4, which is a top blasted surface view of the sintered PCT material.

Figure 3:
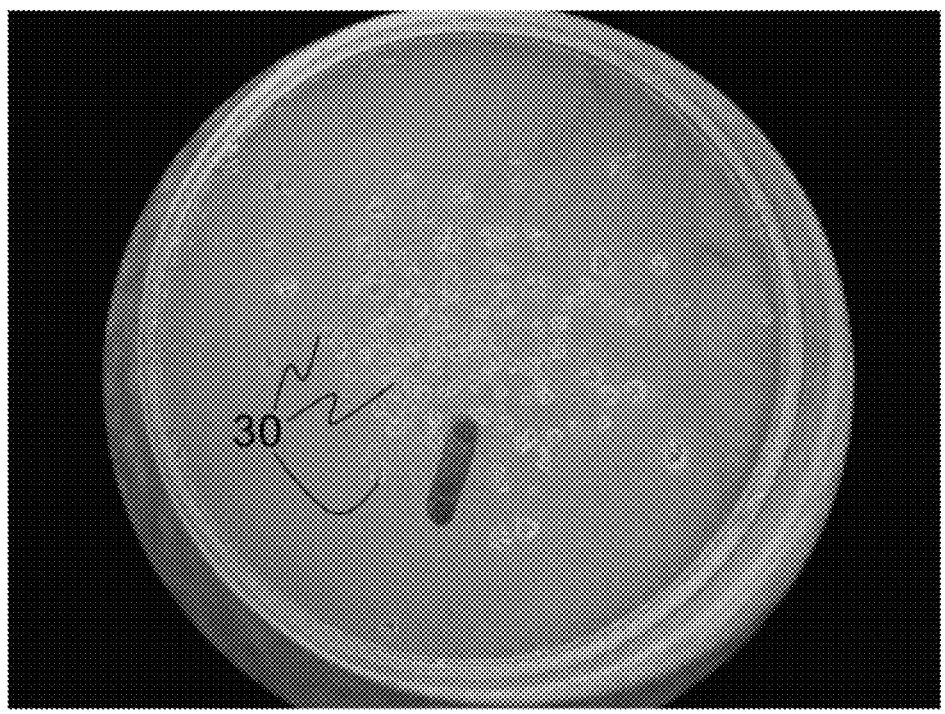
FIG. 3 is a top view of a top surface of a sintered PCD material made with a tungsten-containing grain growth inhibitor and showing abnormal grain growth.
Figure 4:
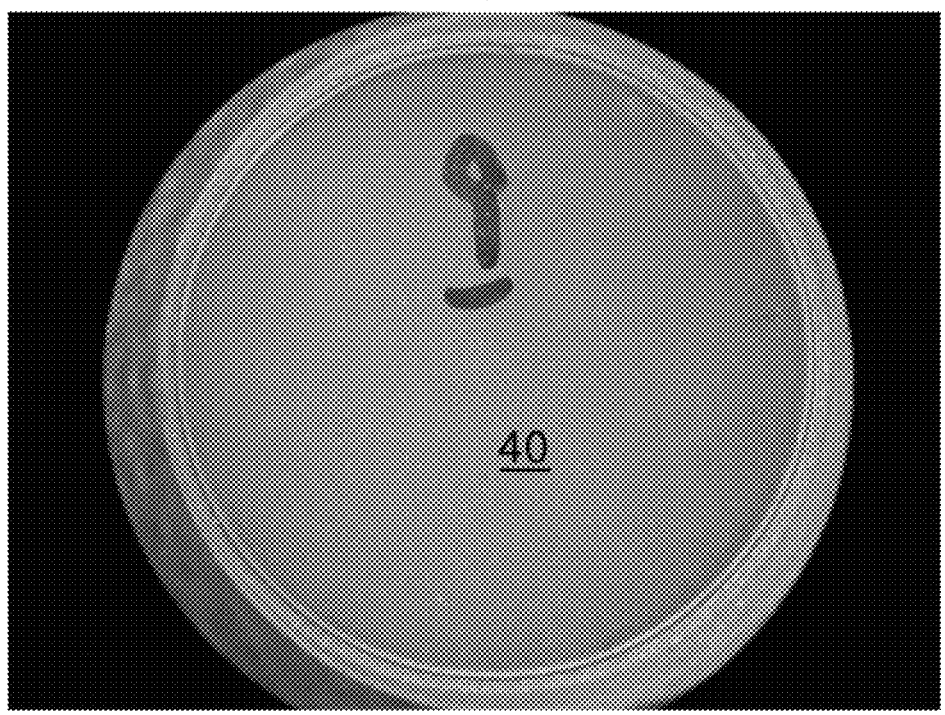
FIG. 4 is a top view of a top surface of a sintered PCD material made with a titanium-containing grain growth inhibitor according to an embodiment of the present disclosure.

As shown in FIG. 4, the PCD has a uniform microstructure 40, without any visible abnormal grain growth or agglomerations. For comparison, FIG. 3 shows a PCD microstructure formed from ultra-fine diamond particles (having an average grain size of about 0.75 micron) mixed with 3% by weight particles of tungsten (having a particle size of about 100 nanometers or less), acting as the grain growth inhibitor. In FIG. 3, significant amounts of abnormal grain growth 30 are detected. FIGS. 3 and 4 show the top blasted surface of the sintered PCD materials.

Figure 5:
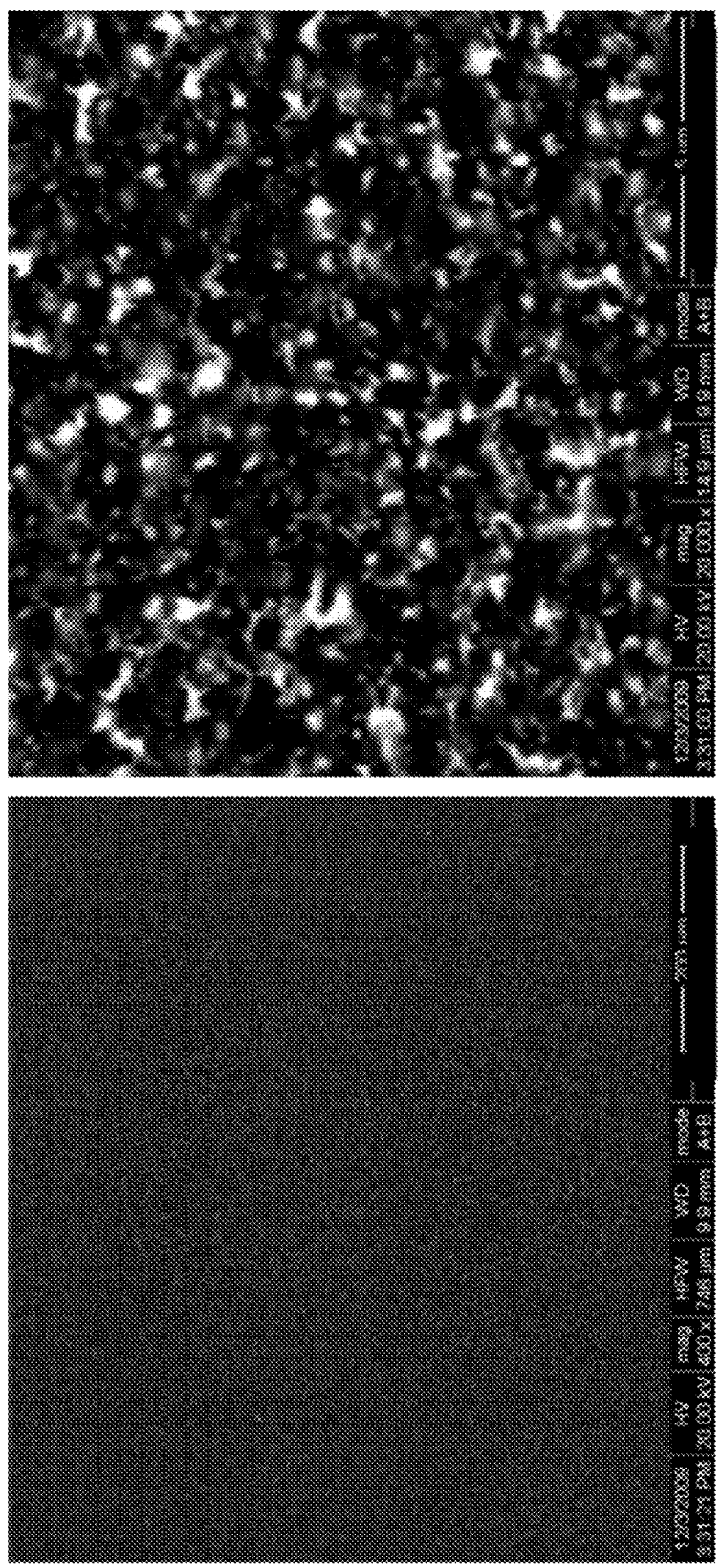
FIG. 5 shows two magnified views of the PCD material of FIG. 4.

FIG. 5 shows a magnification of the sintered PCD material of FIG. 4. The image on the left is a magnification of 400, and the right is 20,000. These images show the uniform microstructure 40 of the ultra-fine PCD with 1.5% TiCN grain growth inhibitor. The darker areas in FIG. 5 are the sintered diamond grains, and the lighter areas between them are the catalyst and grain growth inhibitor particles. The grain growth inhibitor particles in FIG. 5 are within the lighter areas of the image but are too small to see directly. In one embodiment, the particles of the grain grown inhibitor are nano-sized before and after sintering. The blending method described above uniformly disperses the grain growth inhibitor particles within the sub-micron diamond powder, to achieve effective grain growth suppression. Additionally, the cobalt coating provides uniformly dispersed catalyst to promote good sintering. The ultra-fine PCD exhibits superior wear resistance and mechanical strength and performs well in tooling and cutting applications.

In one embodiment, a sintered PCD material formed by the method of FIG. 2 has a uniform microstructure, meaning that it is substantially free of visible agglomerations of grain growth inhibitor that are on the scale of the diamond crystals, and substantially free of abnormal grain growth. About 95% of the sintered diamond grains are about 1 micron in size or smaller. The largest sintered diamond grains are about 5 microns or smaller, or in another embodiment about 3 microns or smaller.

Figure 6:
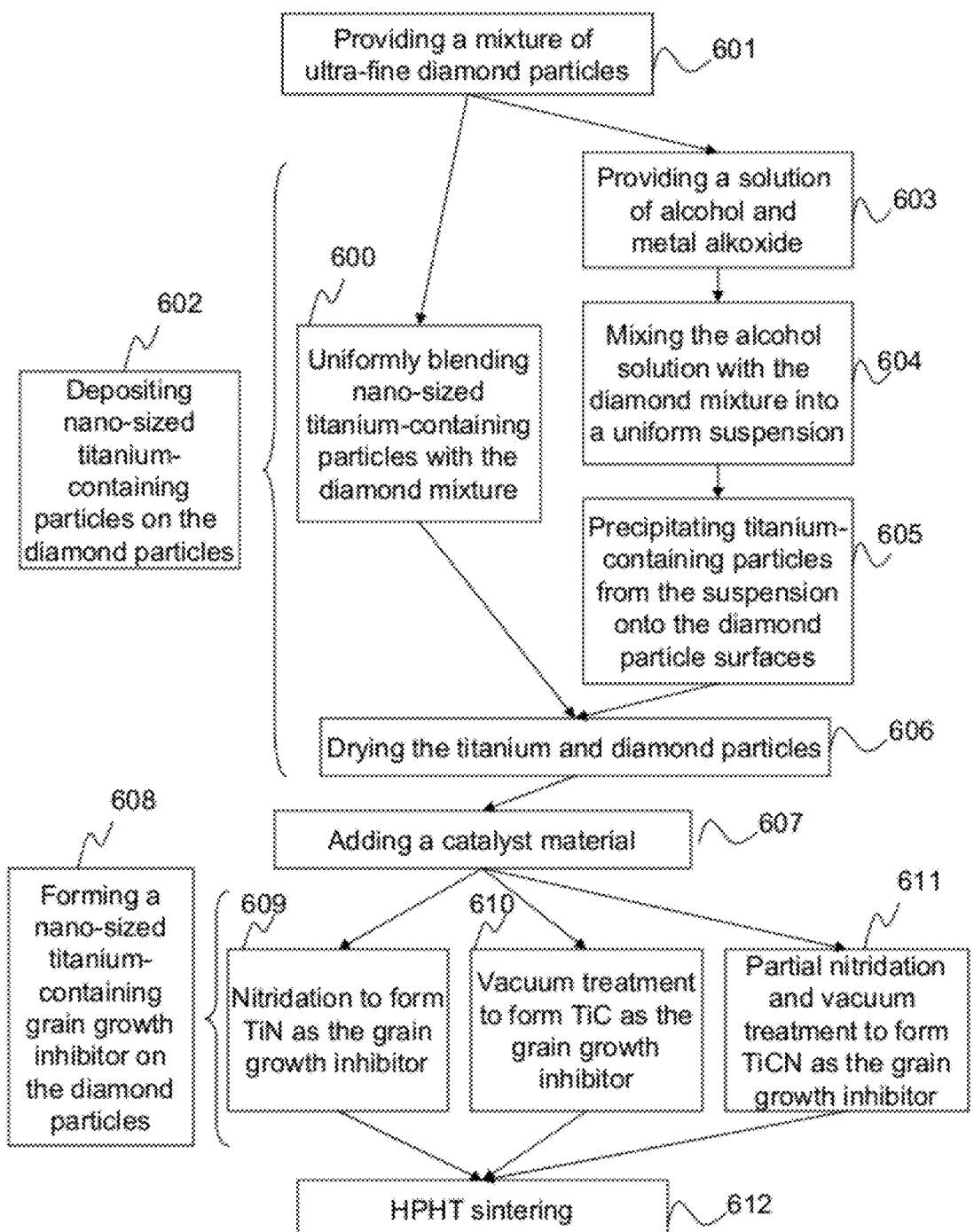
FIG. 6 is a flowchart showing a method of fabricating an ultra-fine PCD material with uniform sintered grain size according to an embodiment of the present disclosure.

A method of fabricating an ultra-fine PCD material with uniform sintered grain size according to another embodiment of the present disclosure is shown in FIG. 6. The method includes providing a mixture of ultra-fine diamond particles (601). In one embodiment, the mixture includes a range of diamond particles between about 0.5 and 1 micron in size, with an average particle size of about 0.75 micron. In one embodiment, the mixture includes a range of particle sizes, with the average particle size less than 1 micron. The diamond particles are provided in powder form.

The method also includes depositing nano-sized titanium-containing particles on the diamond particles (602). In one embodiment, depositing these particles is performed by a wet chemical precipitation method, which may be referred to in the field as the sol-gel method. In one embodiment, depositing the nano-sized particles includes first providing a solution of alcohol and a metal alkoxide (603). The metal alkoxide is a precursor for the grain grown inhibitor that will be formed by the chemical precipitation method (described further below). In one embodiment the metal is titanium and the metal alkoxide precursor is a titanium alkoxide such as titanium n-butoxide $Ti[O(CH_2)_3CH_3)]_4$. In another embodiment the precursor metal alkoxide is titanium isopropoxide $Ti[OCH(CH_3)_2]_4$.

The metal alkoxide is mixed with alcohol to form a solution. The method then includes mixing the alcohol solution with the diamond particle mixture to create a uniform suspension (604). This mixing can be accomplished with a mechanical stirrer. The method then includes precipitating titanium-containing particles from the suspension onto the diamond particle surfaces (605). For example, precipitation can be accomplished by adding water to the suspension. When water is added to the suspension, the following reaction takes place: $Ti[O(CH_2)_3CH_3)]_4 + H_2O \rightarrow TiO_2 + HO(CH_2)_3CH_3$. As a result, titanium oxide ($TiO_2$) particles precipitate out from the suspension and deposit on the surfaces of the diamond particles. The method may also include drying the suspension (606) after precipitation.

As described above, the precursor is uniformly dissolved in the alcohol solution, and the diamond particles are uniformly mixed with the alcohol into a suspension. As a result, this method creates a uniform dispersion of the titanium oxide particles across the diamond particle surfaces when the titanium oxide precipitates from the suspension. The titanium oxide particles are nano-sized particles deposited on the surfaces of the ultra-fine diamond particles.

A second embodiment is also shown in FIG. 6. This alternative embodiment includes uniformly blending nano-sized titanium-containing particles with the diamond mixture (600), rather than using the chemical precipitation method shown in steps 603, 604, and 605. For example, nano-sized titanium oxide ($TiO_2$) particles may be directly mixed with the diamond powder, rather than being deposited by chemical precipitation. These nano-sized $TiO_2$ particles are uniformly blended with the diamond particle mixture by mechanical mixing, such as ball milling or attritor mixing. The mixture may be inspected visually, for example under an SEM, to verify uniform blending. After blending, the mixture is optionally dried (606).

Referring again to FIG. 6, in either embodiment, the method optionally includes adding a catalyst material, such as cobalt, to the diamond powder and titanium oxide mixture (607). In one embodiment, this may be accomplished by a similar precipitation method. The catalyst material may be added to the diamond mixture before or after the titanium oxide particles are deposited.

Referring again to FIG. 6, the method then includes forming a nano-sized titanium-containing grain growth inhibitor on the surfaces of the diamond particles (608). This method includes converting the titanium oxide particles into a suitable titanium-based grain growth inhibitor, such as a titanium ceramic (examples are TiC, TiCN, and TiN). Three variations of this method are shown in FIG. 6. In one embodiment, the method includes nitridation of the titanium oxide particles to form TiN as the grain growth inhibitor (609). Nitridation is accomplished by subjecting the diamond and titanium oxide mixture (the diamond particles with uniform deposits of nano-sized titanium oxide particles) to an ammonia ($NH_3$) flow. Optionally during the ammonia treatment the mixture may be heated to about 1,100° C. This process converts the titanium oxide into titanium nitride (TiN). The result is nano-sized TiN particles uniformly dispersed across the surfaces of the ultra-fine diamond powder mixture.

In another embodiment, the method includes vacuum treatment to form titanium carbide (TiC) as the grain growth inhibitor (610). The titanium oxide and diamond powder mixture is subjected to a vacuum and heated (at about 900-1,200° C.). In the vacuum, the titanium oxide reacts with the carbon in the diamond particles and the following reaction takes place: $TiO_2+C \rightarrow TiC+CO$. The CO is released as gas. The process converts the titanium oxide into titanium carbide (TiC). The result is nano-sized TiC particles uniformly dispersed across the surfaces of the ultra-fine diamond powder mixture.

In another embodiment, the method includes partial nitridation and vacuum treatment to form titanium carbon nitride (TiCN) as the grain growth inhibitor (611). The titanium oxide and diamond powder mixture is first subjected to an ammonia flow (and heated to about 1,000° C.) to partially react the titanium oxide to form titanium oxynitride ($TiO_xN_y$). However, before fully reacting, the mixture is then subjected to a vacuum (heated to about 900 to 1,200° C.). The following reactions take place: $TiO_2+NH_3 \rightarrow TiO_xN_y+H_2O$ (ammonia flow) and subsequently $TiO_xN_y+C \rightarrow TiC_xN_y+CO$ (vacuum). The carbon in the second step is present from the diamond particles themselves. Thus, the titanium oxide reacts with the ammonia flow and with the carbon from the diamond to form TiCN. The CO is released as gas. The process converts the titanium oxide into titanium carbon nitride (TiCN). The result is nano-sized TiCN particles uniformly dispersed across the surfaces of the ultra-fine diamond powder mixture.

Finally, referring again to FIG. 6, the method includes HPHT sintering the diamond and titanium-containing grain growth inhibitor mixture (612). The nano-sized TiC, TiN, or TiCN particles distributed across the diamond particle surfaces act as a grain growth inhibitor to prevent abnormal grain growth of the diamond particles. The resulting sintered PCD structure has a uniform microstructure of fine sintered diamond grains with uniformly dispersed grain growth inhibitor particles between the diamond grains. The sintered diamond grains are about 1 micron or smaller in size. In one embodiment, about 95% of the sintered diamond grains are about 1 micron in size or smaller. The largest sintered diamond grains are about 5 microns or smaller.

The present disclosure provides methods of fabricating ultra-fine PCD material with uniform sintered grain size. A nano-sized titanium-containing grain growth inhibitor is distributed with a mixture of ultra-fine diamond particles, such as diamond particles about 1 micron or smaller. The sintered PCD material has a uniform microstructure with substantially no abnormal grain growth. This PCD structure with very fine diamond grains has desirable strength and wear properties.

Figure 7:
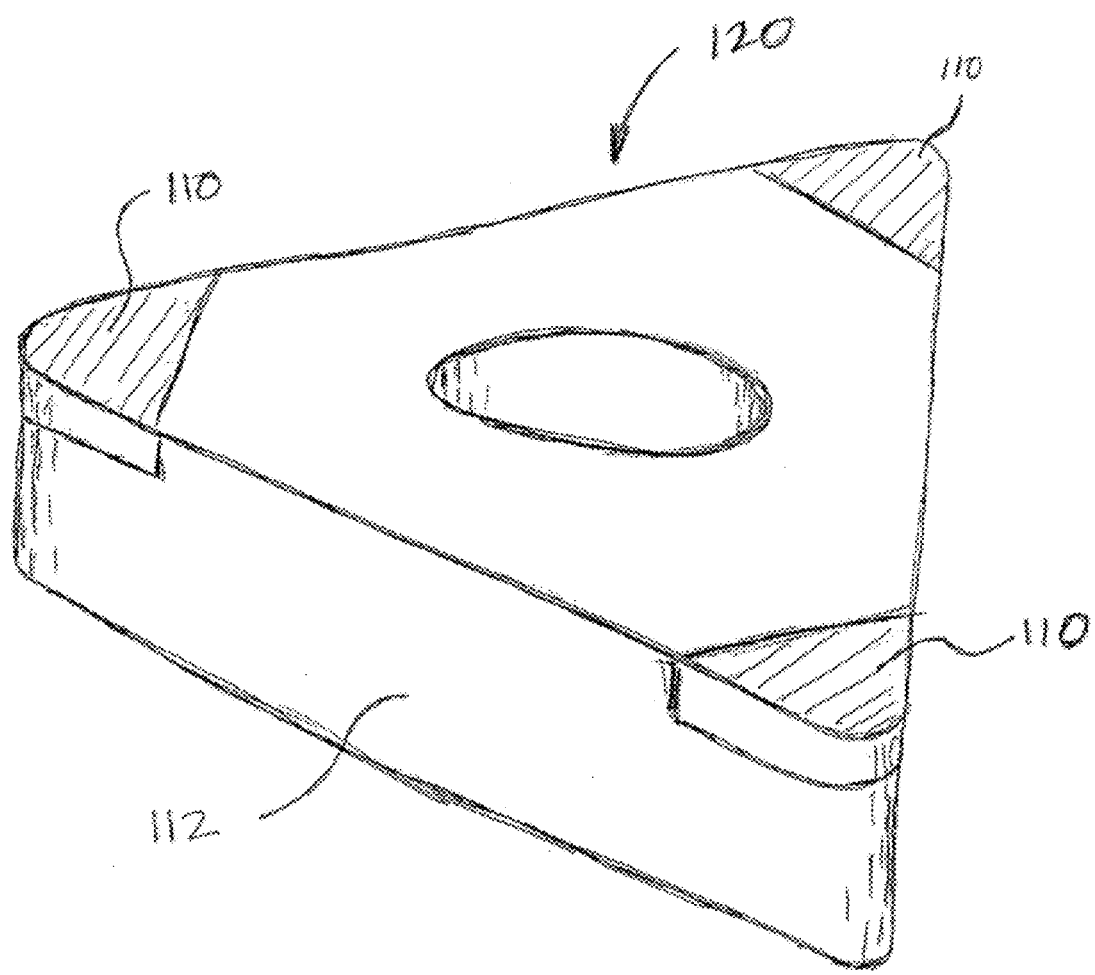
FIG. 7 shows a cutting tool insert tipped with pieces cut from an ultra-fine PCD material, according to an embodiment of the present disclosure.

FIG. 7 shows a cutting tool insert 120 tipped with pieces 110 cut from an ultra-fine PCD material, according to an embodiment of the present disclosure. The cutting insert 120 includes a cemented carbide insert body 112, and the tip pieces 110 cut from the ultra-fine sintered PCD are brazed to the body 112 at the corners of the body. The cutting insert 120 may be attached to a cutting tool for use in a cutting application such as turning or milling. The PCD tip pieces 110 of the insert 120 provide a combination of toughness and wear-resistance for superior cutting performance.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A method of fabricating a polycrystalline diamond material, comprising:
   providing a mixture of diamond particles with an average particle size of about 1 micron or less;
   distributing a plurality of nano-sized titanium-containing particles selected from the group consisting of titanium carbon nitride particles, titanium nitride particles, titanium carbide particles, and combinations of the same, with the diamond mixture, to act as a grain growth inhibitor, wherein distributing the nano-sized titanium-containing particles comprises depositing a plurality of titanium oxide particles on surfaces of the diamond particles to form a diamond and titanium oxide mixture, and converting the titanium oxide particles into a titanium-containing grain growth inhibitor;
   adding a catalyst material, distinct from the titanium-containing particles, to the mixture of diamond particles or the diamond and titanium oxide mixture; and
   sintering the mixture of diamond particles and titanium-containing particles at high pressure and high temperature to create a polycrystalline diamond structure including a network of interconnected diamond grains bonded to each other, with the catalyst material occupying pores between the bonded diamond grains, wherein the sintered diamond grains have an average size of about 1 micron or less.

2. The method of claim 1, wherein the mixture of diamond particles comprises diamond particles in the range of 0.2 to 2 micron.

3. The method of claim 1, wherein the mixture of diamond particles comprises diamond particles with an average size in the range of 0.3 to 0.8 micron.

4. The method of claim 1, wherein the polycrystalline structure comprises a uniform structure of the sintered diamond grains and the grain growth inhibitor, with the grain growth inhibitor being smaller in size than the sintered diamond grains.

5. The method of claim 1, wherein depositing the titanium oxide particles comprises deposition by chemical precipitation.

6. The method of claim 5, where deposition by chemical precipitation comprises providing a solution of an alcohol and a titanium alkoxide, forming a suspension with the solution and the diamond particles, and precipitating the titanium oxide particles from the suspension onto the surfaces of the diamond particles.

7. The method of claim 4, wherein converting the titanium oxide particles into the grain growth inhibitor comprises subjecting the diamond and titanium oxide mixture to an ammonia flow to convert the titanium oxide into titanium nitride.

8. The method of claim 4, wherein converting the titanium oxide particles into the grain growth inhibitor comprises subjecting the diamond and titanium oxide mixture to a vacuum to convert the titanium oxide into titanium carbide.

9. The method of claim 4, wherein converting the titanium oxide particles into the grain growth inhibitor comprises subjecting the diamond and titanium oxide mixture to an ammonia flow and subsequently to a vacuum to convert the titanium oxide into titanium carbon nitride.

* * * * *